US012603912B2

(12) United States Patent
Picard

(10) Patent No.: US 12,603,912 B2
(45) Date of Patent: *Apr. 14, 2026

(54) AUTOMATED SECURITY TESTING SYSTEM AND METHOD

(71) Applicant: EZOTECH INC., London (CA)

(72) Inventor: Michael Picard, London (CA)

(73) Assignee: EzoTech INC., London (CA)

( * ) Notice: Subject to any disclaimer, the term of this patent is extended or adjusted under 35 U.S.C. 154(b) by 75 days.

This patent is subject to a terminal disclaimer.

(21) Appl. No.: 18/606,744

(22) Filed: Mar. 15, 2024

(65) Prior Publication Data

US 2024/0223594 A1    Jul. 4, 2024

Related U.S. Application Data

(63) Continuation-in-part of application No. 16/978,552, filed as application No. PCT/CA2019/050264 on Mar. 5, 2019, now Pat. No. 11,962,610.

(Continued)

(51) Int. Cl.
*G06F 11/00* (2006.01)
*G06F 12/14* (2006.01)
(Continued)

(52) U.S. Cl.
CPC ............................... *H04L 63/1433* (2013.01)

(58) Field of Classification Search
CPC ............. H04L 63/1433; H04L 63/1425; G06F 16/9536
(Continued)

(56) References Cited

U.S. PATENT DOCUMENTS 7,152,105 B2    12/2006  McClure
7,243,148 B2    7/2007   Keir
(Continued)

FOREIGN PATENT DOCUMENTS

EP         2718814 A1    4/2014
WO     03/060717 A1    7/2003
(Continued)

OTHER PUBLICATIONS

Heller, M. "Automated penetration testing prototype uses machine learning" http://searchsecurity.techtarget.com/news/4500279501/ Automated-penetration-testingprototype-uses-machinelearning. 5 Pages. Mar. 18, 2016.

(Continued)

*Primary Examiner* — Jeffrey C Pwu
*Assistant Examiner* — Samuel Ambaye
(74) *Attorney, Agent, or Firm* — Brion Raffoul

(57)                ABSTRACT

Systems and methods for network security testing of target computer networks using AI neural networks. A command and control server controls a number of geographically separated processors running a number of neural networks. A central data hive is accessible to all the processors. The processors are organizable into logical hemisphere groupings for specific tasks and/or projects. For security testing, hemisphere groupings are created for the project. Based on data for the target system on the data hive, attacks are formulated by a hemisphere grouping and these potential attacks are tested against known characteristics of the target network. Validated potential attacks and, in some cases, random attacks, are executed and data generated by the executed attacks are stored in the data hive for use in formulating and executing other further attacks. Potential attacks may involve mining social media networks for data on users of the target system.

19 Claims, 5 Drawing Sheets

Related U.S. Application Data

(60) Provisional application No. 62/763,121, filed on Jun. 29, 2018, provisional application No. 62/638,547, filed on Mar. 5, 2018.

(51) Int. Cl.

| | |
|---|---|
| *G06F 12/16* | (2006.01) |
| *G08B 23/00* | (2006.01) |
| *H04L 9/40* | (2022.01) |

(58) Field of Classification Search

USPC ........................................................ 726/25

See application file for complete search history.

(56) References Cited

U.S. PATENT DOCUMENTS

| | | | |
|---|---|---|---|
| 7,257,630 B2 | 8/2007 | Cole | |
| 7,325,252 B2 | 1/2008 | Bunker | |
| 7,757,293 B2 | 7/2010 | Caceres | |
| 8,365,289 B2 | 1/2013 | Russ | |
| 8,490,196 B2 | 7/2013 | Lucangeli Obes | |
| 8,621,073 B2 | 12/2013 | McClure | |
| 8,887,284 B2 | 11/2014 | Kovar | |
| 9,183,397 B2 | 11/2015 | Futoransky | |
| 2010/0138925 A1* | 6/2010 | Barai .................. | H04L 63/1433 |
| | | | 726/25 |
| 2012/0185944 A1 | 7/2012 | Abdine | |
| 2014/0237606 A1* | 8/2014 | Futoransky ........... | G06F 21/552 |
| | | | 726/25 |
| 2015/0195145 A1* | 7/2015 | Di Pietro .............. | H04L 47/127 |
| | | | 706/12 |
| 2017/0006055 A1* | 1/2017 | Strom ..................... | G06F 30/20 |
| 2017/0048267 A1 | 2/2017 | Yampolskiy et al. | |
| 2017/0061133 A1 | 3/2017 | Trabelsi | |

FOREIGN PATENT DOCUMENTS

| | | |
|---|---|---|
| WO | 2008/109770 A2 | 9/2008 |
| WO | 2012170423 A1 | 1/2013 |

OTHER PUBLICATIONS

"Machine Learning for Pentesters and Security Researchers". Jul. 22-25. Black Hat USA 2017. https://www.blackhat.com/us-17/training/schedule/index.html#machine-learning-forpentesters-and-securityresearchers-5738. 3 Pages.

Mayne, Mark. "Why machine learning is the future of society" Apr. 27, 2017. https://www.htbridge.com/blog/whymachine-learning-isthe-future-of-security.html. 4 Pages.

"Using neural networks for OS fingerprinting" Core Security. https://www.coresecurity.com/corelabsresearch/projects/usingneural-networks-osfingerprinting. 2 Pages.

Lanfang, Wang et al. "A Research of Behavior-Based Penetration Testing Model of the Network." Industrial Control and Electronics Engineering (ICICEE), 2012 International Conference on. IEEE, 2012. 3 Pages.

DEFCON 24 Clarence Chio "Machine Duping Pwning Deep Learning Systems" 55 Pages. Aug. 8, 2016.

Examination Report issued on Dec. 12, 2019 for corresponding Australian Application No. 2018101260. 4 Pages.

EP Communication issued on Oct. 13, 2020 for corresponding European Application No. 19764797.7. 3 Pages.

ISR & Written Opinion issued on Jun. 11, 2019 for corresponding International Application No. PCT/CA2019/050264. 14 Pages.

Supplementary European Search Report issued on Oct. 11, 2021, for corresponding EP Application No. 19764797, 12 pages.

\* cited by examiner

AUTOMATED SECURITY TESTING SYSTEM AND METHOD

RELATED APPLICATIONS

This application is a Continuation-in-Part application of U.S. patent application Ser. No. 16/978,552 filed on Sep. 4, 2020, which claims the benefit of PCT International Patent Application No. PCT/CA2019/050264 filed on Mar. 5, 2019, which claims the benefit of U.S. Provisional Patent Application No. 62,763,121 filed on Jun. 29, 2018, and U.S. Provisional Patent Application No. 62/638,547, filed on Mar. 5, 2018, the entire disclosures of which are incorporated herein by reference.

TECHNICAL FIELD

The present invention relates to network security. More specifically, the present invention relates to systems and methods for automatically testing the security of at least one target network using artificial intelligence.

BACKGROUND OF THE INVENTION

The increasing ubiquity of computer networks in daily life has only heightened the importance of good network security. The hacking of corporate intranets of the past few years and the theft of not just corporate assets but also of customer information (including credit card data and personal information) shows that network security is no longer just a government matter but one for businesses as well.

In addition to periodic audits of corporate network security measures, companies sometimes hire tiger teams that try to hack the company network. These so-called white hat hackers attempt to penetrate corporate networks and, once the networks have been penetrated, the companies are made aware of the vulnerabilities of their cyber-assets. Penetration tests used against target computer networks are, admittedly, old. However, the most effective penetration tests have, so far, been spearheaded by human hackers. Penetration tests on networks can be automated but only after these tests have been formulated and designed by the human hackers. Tests based on open ports and available services on the target networks can be automated but the determination of the need for such tests have, as yet, not been automated. As well, tests on networks by way of the vulnerable human element have also not been automated. Login determination, password guessing, and even determining who the users may be are still within the domain of the human hacker. As such, the speed at which such penetration tests can progress is hindered by how fast (or how slow) the human hacker can gather the information necessary about potential target system users, gather the information about the target system, and how fast the hacker can formulate new potential passwords for such users. In addition, the process is limited by how fast the hacker can test the potential passwords against the target system.

Current systems are also susceptible to inconsistencies when it comes to the testing procedures. Human operator based testing is prone to failings that plague most human-implemented methods: inconsistency and speed. Human-based security tests tend to be inconsistent as the quality of the testing can be dependent on which tester is on duty. Some testers are more conscientious than others and there is a large risk that some tests may be inconsistently applied. Not only are some tests at the risk of not being applied, how those tests are applied is also subject to human failings. Also, even if the tests are applied properly, there is no guarantee that the human tester will apply the tests multiple times—human testers can tend to apply a test once and not re-test. Thus, multiple iterations of the same test are less likely to be implemented with human testers. As well, the speed of the tests can be an issue. A human tester is subject to human speeds and the speed of human thought. Thus, multiple tests may take days if not weeks to implement. Finally, there is the cost of testing. Each human tester will need to be paid and, depending on the systems being tested and how rigorous the testing is, this can be quite expensive, especially for higher level human penetration testing specialists.

Given all of the above drawbacks for current penetration tests, there is therefore a need for newer, more automated systems that can perform penetration tests faster and more efficiently than current systems.

SUMMARY OF INVENTION

The present invention provides systems and methods for network security testing of target computer networks. A command and control server controls a number of geographically separated processors with each processor running a number of neural networks. A central data storage or data hive is accessible to all the processors. The neural networks are organizable into logical hemisphere groupings for specific tasks and/or projects. For security testing, hemisphere groupings are created for the project. Based on data for the target system on the data hive, potential attacks are formulated by a hemisphere grouping and these potential attacks are tested against known characteristics of the target network or target system. Validated potential attacks and, in some cases, random attacks are executed against the target network and data generated by the executed attacks are stored in the data hive for use in formulating and executing other further attacks. Potential attacks may involve mining social media networks for data on potential users of the target system for data useful in automated formulation of potential passwords for such users. Each processor may run a number of neural networks and, within a processor, the neural networks being run may be trained differently from one another.

In one aspect, the present invention provides a system for use in security testing at least one target computer system, the system comprising:

- a command and control server for controlling and managing said system;
- a central data storage for said system;
- a plurality of processors, at least one of said plurality of processors executing computer readable instructions that implements a plurality of neural networks, said plurality of neural networks being organizable into hemisphere groups, each hemisphere group being tasked with at least one specific task, each of said plurality of processors being enabled to send and receive data to and from said central data storage and each of said plurality of processors being enabled for data communication with at least one other processor and with said command and control server;

wherein any data collected by processes executed by said plurality of processors regarding said at least one target computer system is stored in said central data storage.

In another aspect, the present invention provides a method for organizing computer resources for testing a security of a target network, the target network being a computer network, the method comprising:

a) receiving data and characteristics for said target network and storing said data and characteristics in a central data storage data hive;

b) determining a state of said target network based on said data and characteristics stored in said data hive;

c) formulating a plurality of potential attacks using neural networks, said potential attacks being against said target network based on said state;

d) for each one of said plurality of potential attacks, determining if a module exists for said one of said plurality of potential attacks based on said state, said one of said plurality of potential attacks being a module-validated potential attack if said module exists for said one of said plurality of potential attacks, and said one of said plurality of potential attacks being invalid if no said module exists for said one of said plurality of potential attacks;

e) when at least one of said plurality of potential attacks is a module-validated potential attack, determining if conditions for said module-validated potential attack are present based on said data and characteristics in said data hive, said module-validated potential attack being an executable attack if said conditions are present and said module-validated potential attack being invalid if said conditions are absent;

f) when each of said plurality of potential attacks is invalid, executing a probability function that determines if a random module is selected for use in executing a random attack against said target computer system;

g) provisioning resources for each executable attack determined in step e) and for each random attack selected in step f); and h) executing said each executable attack and each said random attack, data being generated by each said executable attack and each said random attack being saved in said data hive.

In a further aspect, the present invention provides a method for organizing computer resources for testing a security of a target network, the target network being a computer network, the method comprising:

a) receiving data and characteristics for said target network and storing said data and characteristics in a central data storage data hive;

b) determining a state of said target network based on said data and characteristics stored in said data hive;

c) formulating a plurality of potential attacks, said potential attacks being against said target network based on said state;

d) for each one of said plurality of potential attacks, determining if a module exists for said one of said plurality of potential attacks based on said state, said one of said plurality of potential attacks being a module-validated potential attack if said module exists for said one of said plurality of potential attacks, and said one of said plurality of potential attacks being invalid if no said module exists for said one of said plurality of potential attacks;

e) when at least one of said plurality of potential attacks is a module-validated potential attack, determining if conditions for said module-validated potential attack are present based on said data and characteristics in said data hive, said module-validated potential attack being an executable attack if said conditions are present and said module-validated potential attack being invalid if said conditions are absent;

f) provisioning resources for each executable attack; and

g) executing said each executable attack, data being generated by each said executable attack being saved in said data hive.

For each executable attack, after execution, data is generated with the data including: an initial state of said target network prior to said execution of said executable attack; parameters of said executable attack; and an end state of said target network after said executable attack has been executed. The method may include determining a difference between said initial state and said end state for said executable attack. This difference and the data determined for each attack may be stored in the storage. In another aspect, the data determined for each attack and the difference are used in at least one training data set for training a machine learning model for predicting potential outcomes of one or more executable attacks.

The method may include the steps of:

aa) determining a sequential series of previous attacks;

ab) determining a difference between said initial state and said end state for each of said series of previous attacks; and ac) determining a cumulative difference for said series of previous attacks, said cumulative difference being a sum of differences determined for each of said series of previous attacks.

A trained machine learning model may be used to predict outcomes of potential executable attacks prior to execution of the potential executable attacks and the method may include calculating differences between the initial state and the end state of the potential executable attacks.

In another aspect, steps aa)-ac) are repeated for each of at least two sequential series of previous attacks and results for steps aa)-ac) for each of these at least two sequential series of previous attacks are combined with the differences for the potential executable attacks to determine which of the potential executable attacks are to be executed.

The cumulative differences for multiple sequential series of previous attacks can be used in a training data set to train a machine learning model for predicting outcomes of potential executable attacks. The machine learning model may be for predicting outcomes of a series of potential executable attacks. Similarly, the machine learning model may be for predicting outcomes of potential executable attacks given an initial state and a potential executable attack. The machine learning model may be used to determine which hemisphere to use for a next executable attack.

In yet another aspect, the present invention provides a system for use in security testing at least one target computer system, the system comprising:

a command-and-control server for controlling and managing said system;

a central data storage for said system;

a plurality of processors, at least one of said plurality of processors executing computer readable instructions that implements a plurality of neural networks, said plurality of neural networks being organizable into hemisphere groups, each hemisphere group being tasked with at least one specific task, each of said plurality of processors being enabled to send and receive data to and from said central data storage and each of said plurality of processors being enabled for data communication with at least one other processor and with said command and control server;

at least one trained machine learning model;

wherein any data collected by processes executed by said plurality of processors regarding said at least one target computer system is stored in said central data storage; and said system uses said at least one trained machine learning model to determine which potential attacks to execute against said at least one target computer system; and said potential attacks are formulated based on said data stored in said central data storage.

The at least one machine learning model may have a function that is at least one of: predicting outcomes of a series of potential attacks; predicting outcomes of potential attacks given an initial state and a potential executable attack; and determining which hemisphere to use for a next executable attack.

The at least one machine learning model may be trained using a training data set that includes one or more of: cumulative differences for multiple sequential series of previous attacks and data determined from an attack, the data including an initial state of the target network prior to the execution of the executable attack, parameters of the executable attack, an end state of the target network after the executable attack, and differences between the initial state and the end state.

The at least one machine learning model may be used to predict a result of potential attacks based on data gathered from previous attacks. The at least one trained machine learning model may also be used to predict outcomes of potential attacks prior to execution of the potential attacks and the system may calculate differences between the initial state and the end state of these potential attacks.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
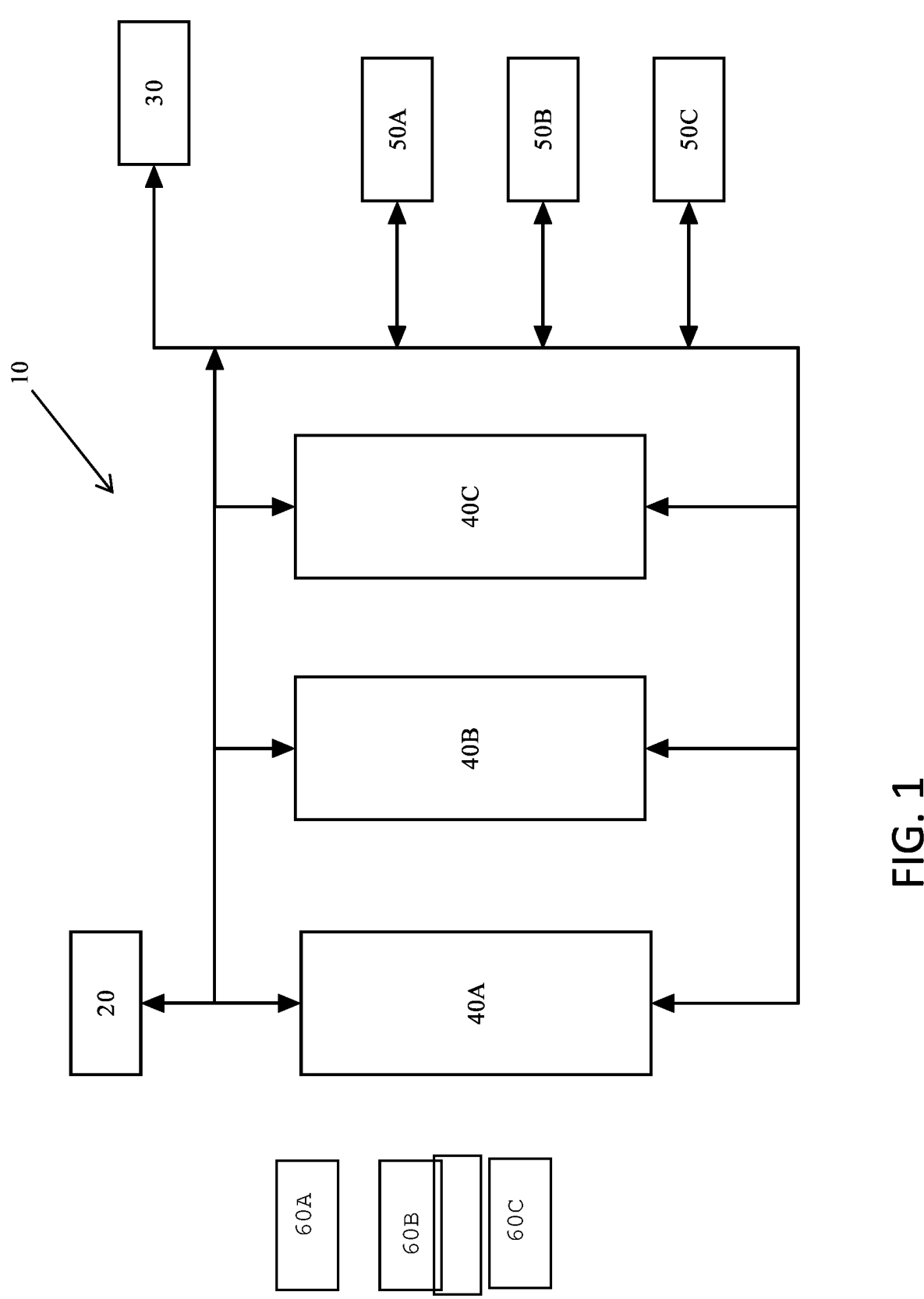
FIG. 1 is a block diagram of a system according to one aspect of the present invention.

Referring to FIG. 1, illustrated is one aspect of the invention. In this aspect, a system 10 according to the invention includes a command-and-control server 20, a central data storage 30 (also referred to as a data hive), a number of hemisphere groups 40A, 40B, 40C, and multiple execution units 50A, 50B, 50C. As can be seen, the control server 20 is in communication with all the hemisphere groups 40A, 40B, 40C as well as with the data hive 30 and the execution units 50A, 50B, 50C. All the hemispheres and all the execution units are in communication with the data hive to ensure that data can be sent to/from the data hive. It should be clear that each of the hemispheres 40A, 40B, 40C contains one or more neural networks. The neural networks are executed on processors such that one processor may implement one or more neural networks. The system may also include trained machine learning models 60A, 60B, 60C. Depending on the function for which the machine learning model has been trained, the machine learning model may be used by the system 10 or by any of the hemisphere groups 40A, 40B, 40C.

It should be clear that, while FIG. 1 shows the machine learning models as being external or separate from the hemispheres, for some implementations of the system of the present invention, at least some of the machine learning models are internal to the hemispheres. Thus, for some implementations, each hemisphere is equipped with one or more machine learning models and may use these trained machine learning models for predicting the outcome of specific potential attacks/actions as well as predicting the outcome of sequences of potential attacks/actions. These internal machine learning models may also be used by one or more of the hemispheres for trajectory projections, "trajectory" being a general trend of outcomes for one or more sequences of attacks/actions. For some implementations, one or more of the machine learning models are mapped to one or more of the neural networks explained below.

In operation, each hemisphere group is dedicated to one type of attack or one type of network vulnerability that can be exploited. (Note that all hemisphere groups are not required to be simultaneously active: hemisphere group activation may be based on what a client wants in terms of testing. Some clients may want all possible types of attacks to be tested while other clients may only want certain types of attacks to be tested.) Each target system has an associated "hive state", a binary string based on the data in the hive storage that represents the overall state of the system. Each hemisphere group has access to this hive state, and uses it to generate a predictive score related to the type of attack to which that hemisphere group is dedicated. Each predictive score indicates whether that type of attack is likely to be successful against the target system. These predictive scores undergo a validation process. Attacks corresponding to any valid predictive scores are passed to an execution unit for execution. (If no predictive scores are valid, a probability function is used to determine whether a random attack should be selected for execution. This probability function will be described in more detail below.) The execution unit tasked with a specific attack (or tasked with a component of such an attack) can then execute the attack or component by calling on other available resources. A module score is generated by the execution of the attack component or the attack itself, and any data generated is then passed on to the data hive. The module score is a multi-bit binary number and can form part of a section of the hive state, and reflects the state of a portion of the target system corresponding to that module after the attack or attack component has been executed. The module score is compared to a corresponding section of the hive state, and if there are differences, the original hive state and data from the attack module are stored in the hive storage.

An updated hive state is then produced. In some implementations, the module scores, when concatenated, form an updated hive state. Such concatenation may occur in in a standardized order. In other implementations, individual module scores can be substituted for corresponding sections of the hive state. For instance, if many individual module scores differ from corresponding sections of the original hive state, concatenating them all into a new hive state may be preferred. However, any individual module score that indicates a change in the hive state can be substituted into the hive state, rather than re-concatenating many scores.

An updated hive state may indicate that new possible attacks or attack vectors are now available. This updated hive state is thus processed by the hemisphere groups, and the entire process then repeats such that, through multiple iterations, various multiple attacks are executed against the target system.

It should be clear that, while the hemisphere groups have neural networks within them, execution units may depending on the attack or attack component being executed, form or use other neural networks. These other neural networks may be used for specific tasks such as natural language processing or image classification or processing.

As noted above, the system is ideally tasked with automated security testing of a target system. To this end, based on the data stored on the data hive regarding the target system, the system generates, validates, and executes attacks, exploits, and penetration tests against the target system. Data generated during an attack or exploit is stored in the data hive. This data generated by tests, exploits, and attacks is then used to formulate, validate, and execute further actions aimed at determining any security vulnerabilities that the target system may have. Should the data within the data hive not be sufficient for specific attacks or tests, the one or more of the hemisphere groups (and the internal artificial intelligence neural networks within) may launch probes against the target system as an attack component to gather such data and/or seek data regarding the target system online. It should be clear that all or most aspects of the target system may be subject to the attacks and/or tests from the system, including any ports, services, and/or protocols that may be available or present in the target system. As well, users of the target system are also potential targets for exploitation. As such, much like human hackers and system testers, the system will seek out potential target system users and attempt to generate possible user logins and passwords as well as email addresses, email logins, and email passwords for these users. Data which can be the bases for such generated potential logins and passwords may be mined from publicly available sources such as social media websites, social media networks, personal websites, Dark web sources, bulletin board postings, and other online sources. In addition to the above, the system may also launch phishing attacks to try and obtain login credentials from unsuspecting users of the target system.

It should be clear that the terms "target system", "target computer system", and "target network", as used herein, are interchangeable and may encompass a corporate intranet, a corporate data network, one or more websites, a company's social media accounts, a corporate email system, and a company's IT infrastructure as a whole.

For clarity, an attack may be defined as an attempt to gain unauthorized access to or make unauthorized use of a computer or IT asset on the target system. Similarly, an exploit is a specific type of attack, one which takes advantage of a particular vulnerability of the target system.

The system operates by first receiving data regarding the target system. This may come from a client wishing to have his or her corporate website/corporate network/IT assets tested for vulnerabilities. This data may be as simple as the corporate website address, the corporate IP address, and any other data which may be made available to the system. The data and known characteristics about the target system are then stored in the data hive. The system then generates a hive state based on the known data and characteristics of the target system. Scoring may be performed based on inputting the known data and characteristics of the target system into multiple functions, each of which generates a binary value (i.e., a "1" or a "0"). As an example, a function might be encoded to answer a query such as "is port A open?" or "is service X exposed?" The result would, of course, be a binary 1 or 0. Preferably, each function only encodes the presence or absence of a single data bit or a single data point in the data hive regarding the target system. The results of all the functions are then concatenated into a string of 1s and 0s, whose binary value operates as the hive state, the state of the target system for that particular point in time. In one implementation, the hive state is a 2048-bit binary number. In such an implementation, there would be 2 possible hive states, representing $\sim 3.2*10^{616}$ possible distinct states of the target system. Additionally, in some implementations, each hive state can be seen as a composition of binary substrings, each binary substring corresponding to a specific attack and/or execution module. In such implementations, the binary substrings that compose the hive state are preferably arranged in a standardized order (that is, the same bits of the hive state always correspond to the same specific attack and/or execution module). The hive state can also be seen as an indication of the state of the hive data for that particular target system indicating which features, data, and characteristics about the target system exist on the data hive.

Once the initial hive state is calculated, this is made available to the various active hemispheres tasked with a specific project (e.g., the penetration testing of a specific target system using a specific type of attack or specific groups of attacks). The various processors in the various hemispheres may be executing software that implements neural networks that, in one implementation, is specifically configured for the classification of input data. These neural networks may then take the hive state and, based on the bit values, combinations of bit values, and perhaps the overall hive state, produce predictive scores representing potential attacks and/or exploits for the system to try on the target system. This so-called prediction step predicts which attacks and/or exploits may succeed against the target system. The prediction step processes the hive state using the neural networks, to essentially determine which attacks/exploits may work on the target system. The prediction step also determines which attacks/exploits may be launched based on the available data. The neural networks determine which combinations of available assets (e.g., ports, services, protocols, data, emails, etc.) are suitable for a specific attack or exploit. By using neural networks, complex combinations, and sub-combinations of attacks and/or exploits, and even what-if scenarios, can be determined to be possible against a specific target system. It should be clear that a neural network, with the hive state as an input, need not result in a single possible attack or exploit. Depending on the result from the neural network, multiple predictions as to which attacks, exploits, and tests may work may result from the output of a single neural network. As a simplified example, a neural network may determine that, since ports A, B, and C are known to be open on the target system and since services X, Y, and Z are known to be available on the same target system, then attacks D, E, and F and exploits G, H, and I are all possible against that target system.

In one implementation, each prediction (i.e., a possible attack or exploit) from a neural network results in a list of values that are between 0 and 1. These values are then rounded to either a "1" or a "0" to result in a multi-bit binary number that comprises the predictive score. The predictive score therefore represents the prediction that a specific attack/exploit may work on the target system. In some implementations, this predictive score may be a 16-bit number, though in other implementations this predictive score may be either longer or shorter than 16 bits. The predictive score is then used as a UUID (universally unique identifier) and is used to validate the predictive score. At a first level, the validation operates by determining if the UUID corresponds to an existing attack or execution module in the system. If the module corresponding to the UUID exists, then the predictive score passes the first validation test. A second validation test is then performed, that of determining if enough resources and/or data exists to execute the module.

The requirements of the module are checked against the hive state and against the data in the data hive. If all the requirements for executing the module are present, then the predictive score is fully validated. If not all of the requirements are present, then the predictive score is not validated and is discarded. As an example, if a module requires a valid login name and a valid password for that login and these are not present in the data hive, then the predictive score is discarded. Similarly, as another example, if the MAC address of a router in the target system is required by a module and such data is not available, then the predictive score is discarded (i.e., the module is not executed). It should be noted that if the predictive score is validated both times, the final validation step is to determine if other processors or execution units are executing the same module.

This is done by querying the other processors. If another processor is already executing that module against the same target system, then the predictive score is discarded. Of course, if the predictive score passes this final validation step, then the module is set for execution.

As a more concrete example of the above process that ensures that the module is not being executed by another processor, this can be done by querying the command and control server using a process called pidlocking (i.e. process ID locking). In pidlocking, the module arguments (i.e. target IP address and target port), the hive name, and module, and an MD5Hash (a generated checksum) are submitted to the command and control server with a pidlock POST request. The command and control server response returns {"status": "success"} or {"status": "failed"}. If the command-and-control server returns {"status": "failed"}, then the module is not executed since the MD5Hash is already present within the pid (process id) table and is therefore being executed by another processor. Once the processor is done executing a module, a pidunlock POST request is made using the same MD5Hash to remove the value from the pidtable.

If a hemisphere fails to generate a valid predictive score, a probability function is executed. This probability function determines whether a hemisphere selects a random module for execution against the target system. In one implementation, the probability function randomly generates an output number for the hemisphere, which can be bounded between a pre-set minimum value and a pre-set maximum value. This output number is compared with a pre-set threshold value that is also bounded between those minimum and maximum values. If the output is lower than that pre-set threshold value, the hemisphere selects a random module and executes that random module against the target system without first validating the random module. Each time a hemisphere fails to generate a valid prediction, the pre-set threshold value for that hemisphere is increased. Thus, each time a hemisphere fails to generate a valid prediction, the probability that the hemisphere will select a random module increases (because there is a higher chance that the randomly generated output number will be lower than the threshold value). On the other hand, each time a hemisphere produces a valid prediction, the pre-set threshold for that hemisphere is decreased. The use of such a probability function adds an element of randomness into the present invention and allows a trial-and-error approach when no valid predictions have been made. Additionally, as information about successful attacks is stored in the hive storage, if a randomly selected attack module is successful against the target system (i.e., the module score differs from the corresponding section of the hive state), information about that successful randomly selected attack will be preserved. In this way, the system can learn new conditions in which certain attacks were successful. These new conditions thus become part of the 'knowledge base' of the system.

For execution, the module is added to an execution queue along with the information needed for the module's execution. The module may be executed by any of the available processors based on the available resources for the system. After execution, any data generated by the module's execution is added to the data hive and may be used for later iterations of the prediction process outlined above. As can be imagined, data added to the data hive can change the hive state and, in doing so, may allow for other attacks and/or exploits to be available to the system. Of course, any successful penetrations of the target system can be included in a suitable report to the client. Preferably, such a report would include the vulnerabilities, the methods used to gain access to those vulnerabilities, and an indication as to how such vulnerabilities can be exploited to gain further unauthorized access to the target system. Depending on the tests executed as well as the configuration of the system, the report may include a vulnerability analysis report, a remediation plan based on vulnerabilities detected in the target system, a penetration test report, an application test report, and a social engineering test report (i.e., whether and how spoofing/phishing attacks were successful/unsuccessful), as well as remediation plans based on any of the above tests.

From the above, it is preferable that such a report includes an executive summary (indicating the scope of the test as per which hemispheres were enabled for testing) and the most critical vulnerabilities that were discovered. As well, it is preferable that the report include statistical data and graphs to visualize the number of vulnerabilities discovered (the vulnerabilities being organized by their risk rating), the vulnerabilities themselves, the methods used to gain access to those vulnerabilities, an indication as to how such vulnerabilities can be exploited to gain further unauthorized access to the target system, and a mitigation plan for such vulnerabilities. For proof of the presence of the vulnerability, suitable screenshots may also be provided in the report.

It must be noted that the execution of a module may also involve the engagement of other processors and other neural networks. As an example, if a module designed for a login-based attack is executed, that module can activate a neural network to analyze and extract names from social network webpage as well as to analyze and extract email addresses from the results of a targeted online search.

As well, other processors and neural networks may be called on to sift through the data gathered from other websites to determine a potential user's interests and, accordingly, possible passwords for that potential user.

As noted above, other processors and other neural networks may be engaged in aid of an attack. As another example if a module was designed for performing login-based attacks against a web-form and the web-form was designed with a CAPTCHA test, a Convolutional Neural Network can be loaded that has been trained to specifically solve CAPTCHA tests. Another example of using dedicated neural networks is the use of natural language processing. For instance, a post-exploitation module may be executed where the module is designed to login to a compromised email account and read over each message sent and received with the objective of extracting sensitive information. This module can implement natural language processing in order to derive context from emails and to thereby extract sensitive data, including financial information or additional passwords. It should be clear that these additional neural networks are not part of any hemisphere and are libraries accessible by modules during run time. Additionally, it should be noted that these subsidiary neural networks are built into the automation workflow by the module developer and it is up to the module developer to use their discretion to determine if the use of an additional neural network is applicable to the module. For instance, if a module was to be designed to automate the process of downloading and analyzing attachments from a compromised email, it would be likely that the module developer would determine that the best way to achieve this would be by using multiple neural networks that implement systems such as image recognition systems and natural language processing systems.

It should therefore be clear that, at any given point, the system may have multiple neural networks in their respective hemisphere groups generating potential attacks to the target system based on the hive state while, at the same time, other neural networks are, in parallel, executing other attacks and/or exploits against that target system as part of an execution unit. As well, other parts of the system may be performing a data sweep and/or reconnaissance to find further data regarding the target data. This data sweep may take the form of generating queries on online search engines to search for email addresses with the target system's domain name. As well, this may take the form of analyzing and parsing the target system's website to, again, extract email addresses, the names of potential users of the target system, contact information (e.g. telephone numbers, contact emails, names of contact persons), as well as potential target system portal information. It should be clear that, for online queries, the results of online searches can, again, be analyzed and parsed to find such information.

In addition to the above, publicly available social media networks and websites may also be mined for suitable information. Once the names of potential users of the target system are known (i.e., stored in the hive storage and made available to the system), these names can be searched for in social media networks such as LinkedIn and Facebook. These publicly available networks can then be, again, mined for information regarding the potential users. Such information retrieved is stored in the hive storage and is made available for later attempts at gaining access to the target system.

The above data mining operation may form one stage of a more complex attack that involves gaining access to the target system by logging into the target system itself. The system can identify target system login portals commonly used by employees such as email and VPN web portals. The IP addresses in use by a target system may be found by analyzing DNS responses for specific queries such as the results of an MX record or SPF record. This may disclose information of hosted services or which IP addresses are able to send mail on behalf of the target system domain. These and other tasks can be automated by using the classifier neural networks to classify the state of the available data and, based on that available data, determine whether a DNS record search, an IP address scan, or an analysis of web responses for login portal is necessary.

Once login portals have been identified, user names and passwords would be needed to be able to login to the target system itself. As noted above, social media networks may be mined for such information as people tend to self-identify their employers. By analyzing and parsing search results on queries based on the target system's organization name, as well as search results based on the known information from the target system's own website, the names of potential users can be found. In addition, metadata from files found in Google searches (e.g., PDF or DOC files) can be retrieved and analyzed for author information. As well, targeted online searching can result in email addresses from forum posts or from blog postings. Another useful method for automated gathering of information, once the names of potential users are known, is the analysis of previously hacked databases that have been publicly leaked. These hacked databases from organizations such as Ashley Madison, Adobe, MySpace, and more, can yield not just employment information but also further names of potential users and passwords of the target system.

With the information gathered from various sources, the system can then seek suitable usernames and login information. The naming convention or the login convention can either be determined from an available known email address (from the data mining operation) or from an analysis of mined information. As noted above, this and other analyses may be performed using the various neural networks that form part of the system. Once the naming convention has been determined and once multiple potential target system users have been identified, a list of potential accounts on the target system can easily be automatically generated.

With the login portals determined and potential usernames and accounts identified, the system can then determine potential passwords for these accounts. Each potential user, now identified by name, can be the subject of an online search and not just on identified social networks. In addition to the well-known social network platforms (e.g., Facebook, MySpace, etc.), searches can also be performed on professional network sites such as LinkedIn. These searches on the potential user should result in data reflecting what is important to that person as well as that person's interests. As an example, a suitable search on the social network platforms could result in, among other data, that person's possible birthdate, dates of milestones in life (e.g., graduation date, children's birthdates, etc.), the names of people potentially close to that person (e.g., names of spouse, children, friends, and/or pets), that person's favorite movies, that person's favorite songs, events that occurred in that person's life (e.g., concerts attended, vacations taken, where the vacations were taken, etc.), and sometimes even what is tattooed on that person's body, or the bodies of their family members, acquaintances, and friends.

Natural language processing may be used to identify addresses, phone numbers, zip or postal codes, as well as names and other identity signifiers.

Figure 2:
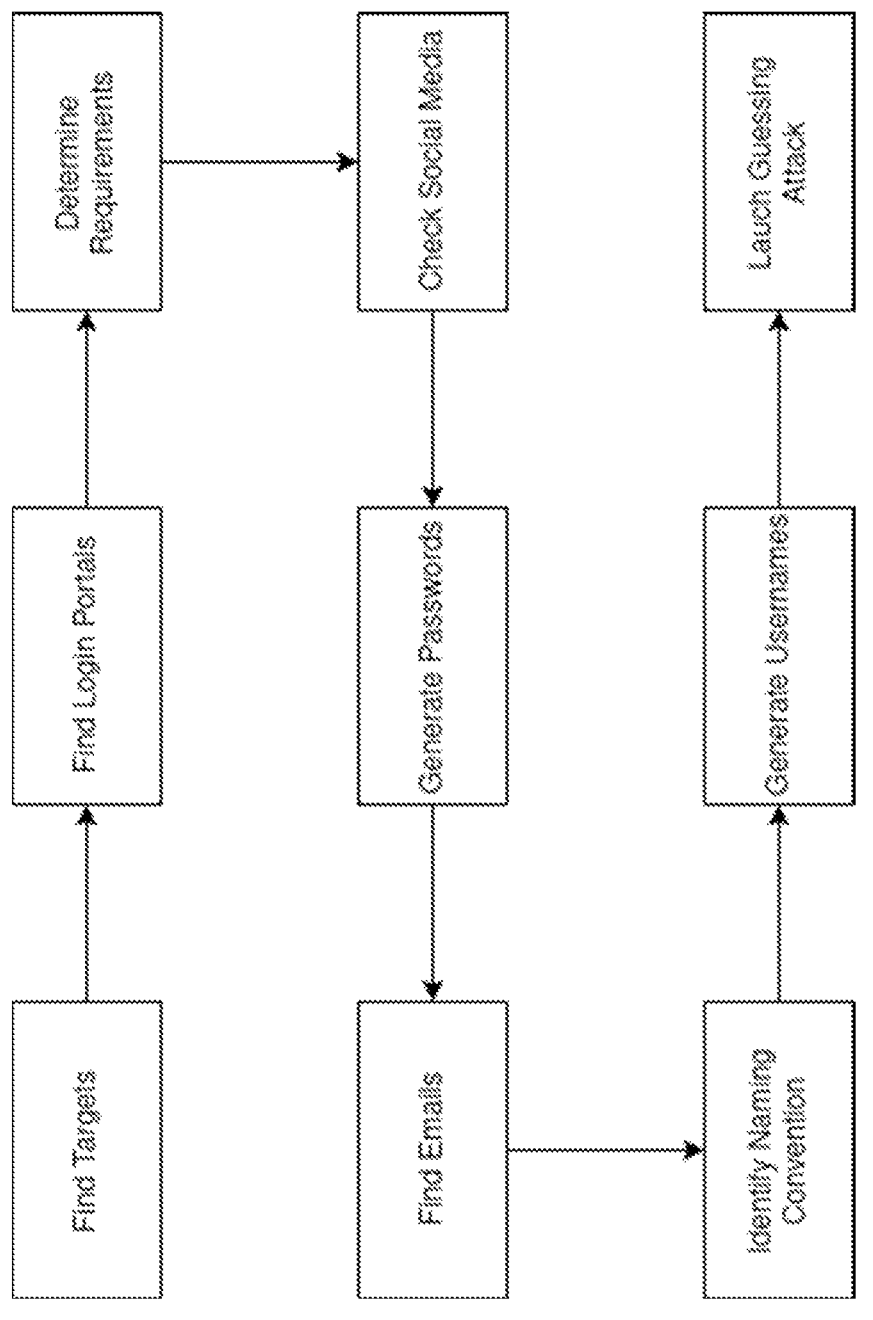
FIG. 2 is flow diagram detailing the steps for a login-based attack.

These data points for each potential user on the target system can form the basis of potential passwords that can automatically be generated by the system. In addition to these data points, common dictionary words related to the person's position within the target organization or related to that person's interests can also be used as the bases for automatically generated potential passwords. The automatically generated potential passwords can be a random rearranging of the various data points for that person (e.g., that person's last name concatenated with his or her first name, a pet name concatenated with a last name, an important date concatenated with non-letter symbols, etc., etc.), a random combination of these data points, a combination of one or more of these data points with letters, with numbers, and so on. The result is a list of automatically generated potential passwords for each of the potential usernames for the target system. With these potential names, usernames, and passwords generated, the system can then launch a targeted attack on the various login portals for the target system. As can be imagined, the attack can simply be one where the system enters the various usernames into the login portal and then sequentially tries the various possible passwords into the portal. The main parts of the process for a login-based attack are detailed in FIG. 2.

As noted above, any data derived from any of the attacks or from any of the probes or analyses of websites or of search results are all saved in the data hive. This ensures that the data is available for the generation of other possible attack vectors and other potential attacks or exploits against the target system.

It should also be clear that other types of attacks that target the users of the target system are also possible. One other type of attack is the more insidious phishing attack. Phishing is defined as the attempt to obtain sensitive information such as usernames, passwords, and credit card details (and money), by disguising an attacking entity as a trustworthy entity in an electronic communication. Thus, at its core, the phishing attack involves sending a disguised illegitimate email that prompts the recipient to re-enter his or her login credentials. When the user enters his or her credentials, the system can then use those login credentials to enter the target system and thus gain access to the target system's assets. Such access would allow other attacks to be possible and other parts of the target system to be compromised. The phishing attack can be launched once enough information has been gathered about the target system users such as email addresses. Preferably, the format and look of either the web login portal or the email login portal for the target system is known and can be replicated by the system. This can be extracted once the address of the login portal being used is known. Once a list of target email addresses have been compiled and once the fake login portal has been created, an email can then be formulated with the email warning or requesting that the recipient re-login because of some system issue or error. A link can be inserted into the email that causes its activation to bring the user to a webpage that replicates the target system's email login portal or the target system's web login portal. Of course, for added authenticity, the email sent can be spoofed so that its origin can seem to be from either the target system's administrator or a target system user in a technical role (e.g., someone in the IT department that runs the target system). Alternatively, the email might describe a change or an issue with a mail server and explain that, in order to prevent further problems, the target system user is required to authenticate the phishing link in the email. Using the classifier neural network, the system can select the best fitting email template to use based on the information that has been saved in the data hive.

For the replication of the login portal, one option would be to analyze the HTML, CSS, and Javascript source code of the target login page works, and then to recreate that login portal using the line by line code of the legitimate portal. Another option would be to create a reverse proxy using a similar domain name and a valid SSL certificate that allows for the capture of the user's password submissions from target system users. This step may be accomplished by using the neural network classifiers, as creating a reverse proxy requires both knowing a login portal, HTTP response headers for the login portal, and being able to generate a believable domain. The system may also slip in exploit code into the page content if a vulnerable client browser is identified. This allows for social-engineering/phishing attacks to deliver payloads such as Trojans (i.e., software that gets installed on to a system and gains access from within the network) to gain internal network access.

Figure 3:
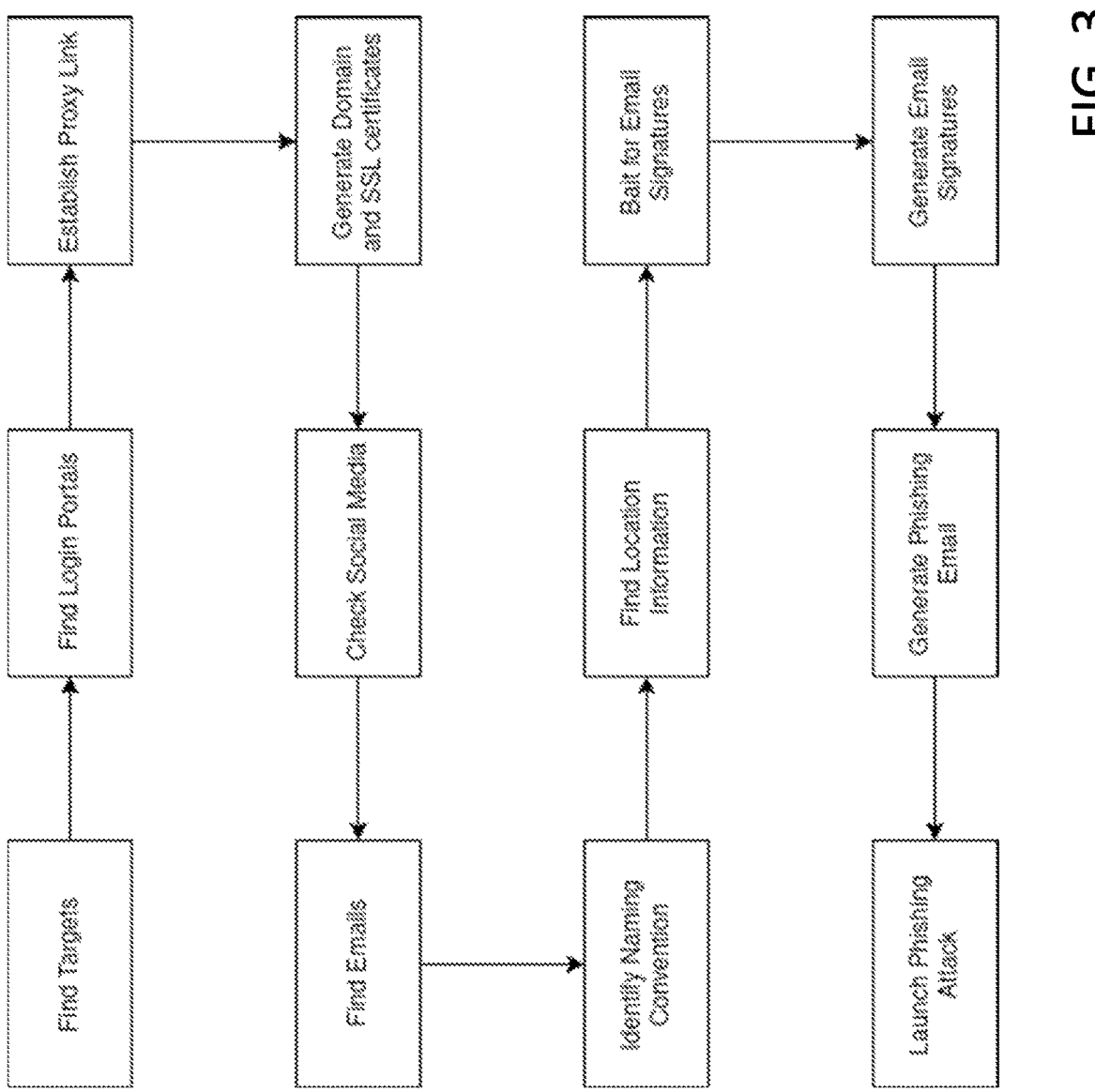
FIG. 3 illustrates the steps in a social engineering-based attack.

As noted above, the email generated may be configured to come from a member of the organization's technical team, i.e., the IT department in charge of the target system. The identity of a member of that department may have already been determined and stored in the data hive if a password or login-based attack has already been launched. If not, such an identity may be found by mining the various online sources noted above. To add further credence and authenticity to the email, a signature may be generated for the email or the signature may be extracted from a legitimate email. This may be executed by harvesting email addresses—pre-generated emails from fake email accounts may be sent out to known or potential email addresses in an attempt to elicit a response from a user of the target system. Any response received from the target system user might contain a valid email signature and this signature can be extracted and used in later fake emails. Alternatively, with enough information gathered, the system can create an email signature by generating one using location information discovered during reconnaissance steps. The main steps in the process for a social engineering/phishing attack can be found in FIG. 3.

It should, however, be clear that some implementations of the system may use a less sophisticated social engineering/phishing attack. Instead of customized emails based on data derived from users of the target system (e.g. copying user signatures), a simpler option may be to generate simpler emails purporting to be from users of the target system. Such emails, while possibly less effective, may still prove to be useful as some users may still be duped by such measures.

As noted above, the system may perform penetration tests on the target system to determine its vulnerabilities. In addition to the usual scanning and testing for open ports, the system may combine the detected vulnerabilities to find heretofore unknown issues with the target system. Known scanning methods involve scanning for open ports and attempting to grab version information related to the listening service. This version information is then cross-referenced with publicly disclosed vulnerabilities to determine the risk associated with the finding.

For the system, vulnerability scanning begins with no information present within the data hive regarding the target system. This results in a low hive state (that is, because little information is available, more initial functions return "0" than return "1") and the system thus executes preliminary testing modules such as ping sweeps and port scans. As data discovered in these sweeps populates the data hive, the system will identify more opportunities to run additional fingerprinting modules. Depending on the kind of data discovered and saved to the data hive, the system will predict and generate new opportunities. The initial fingerprinting modules are used to get version information from the target system.

It should be clear that, while the above describes a reconnaissance aspect of the system (where the system probes and scans the various services and ports on the target system) based on the hive state, in other implementations, this reconnaissance may occur regardless of the hive state. Thus, regardless of the hive state, the system may probe and scan the target system for what services and ports may be open and vulnerable. As noted above, the result of such probes provides data for later possible attacks and exploits. In addition, other implementations of the system may have, in addition to (or forming part of) a monolithic hive state binary number that determines the potential attacks and actions of the system, smaller 128-bit data chunks derived from the results of the reconnaissance of the target system are used. These 128-bit data chunks would detail the results of the port scans and service probes into the target system and, based on the contents of the data chunks, the system can predict which attacks or exploits may succeed, provision such attacks or exploits, and eventually launch such attacks or exploits.

Once services have been identified and version information is known, the system can then attempt to predict which modules can be executed to trigger vulnerabilities. For instance, if an OpenSSH server is identified, the identifying neural network will classify it and select the appropriate modules. Each module is a standalone attack which can be executed in an attack chain within any order.

The module(s) executed depends on the predictions produced by the classifier, as discussed above. Each vulnerability reported in the data hive is then classified in an attempt to select an exploitation module. For instance, if a password guessing vulnerability is identified where a user's email password has been guessed, the system will likely identify the opportunity to run an "email harvester module" which can use natural language processing to identify sensitive information within an employee's emails. Additionally, software exploitation modules use payloads that are automatically generated using information collected in previous phases/data sweeps. These payloads act as droppers to download and execute Trojans that will provide the system with remote access to the affected target system. Once this occurs, the system can perform target-system-side post-exploitation, which includes escalating privileges and spreading penetration software to additional systems that are discovered behind firewalls. Such penetration software, once installed, can thus be controlled from outside the firewalls and can assist in gaining further access to the target system.

Figure 4:
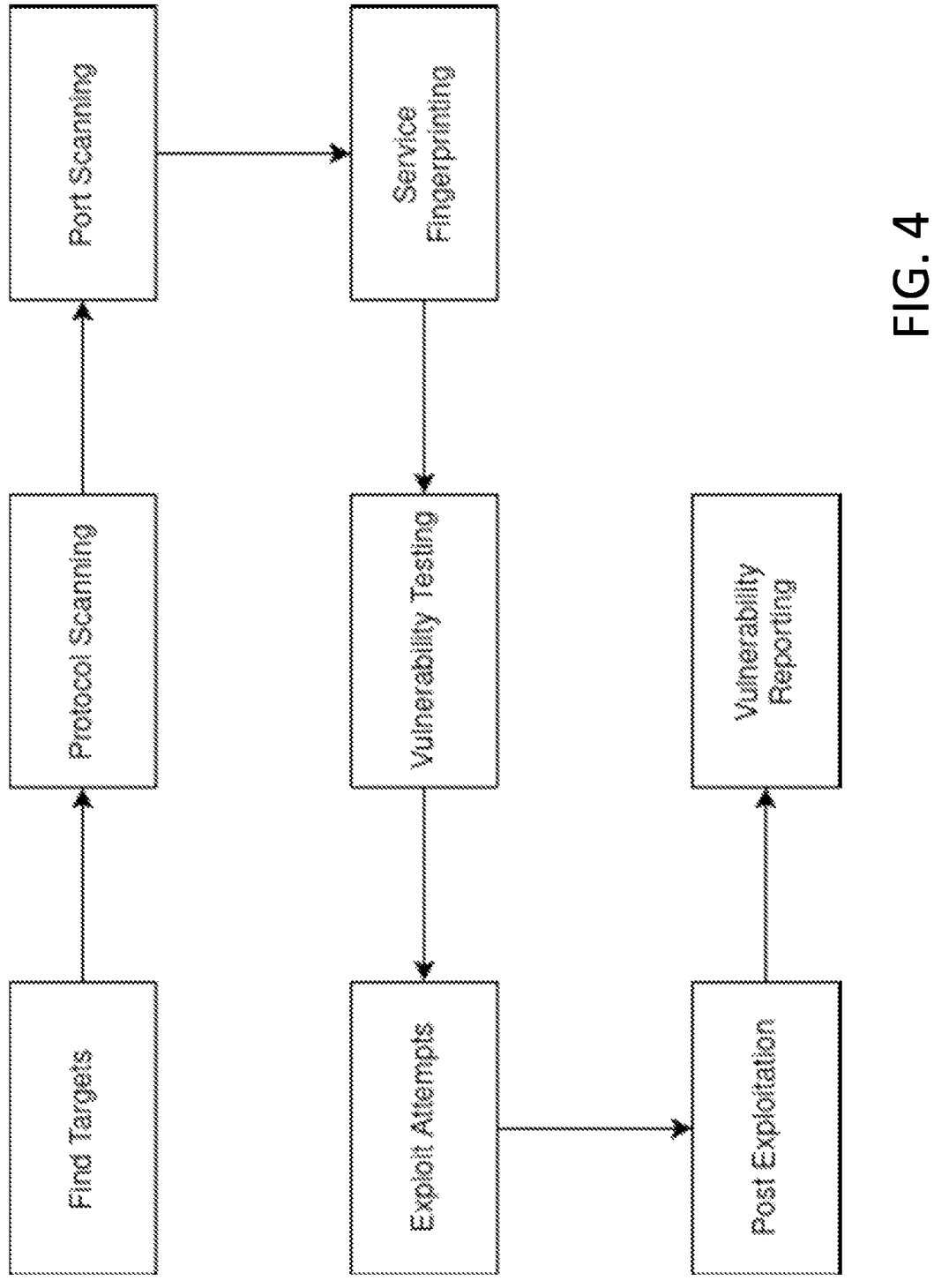
FIG. 4 is a flow diagram showing the steps in vulnerability testing.

The above process is repeated for each vulnerability discovered during a vulnerability assessment phase. The system therefore tries to trigger every vulnerability possible, but also tries to exploit the vulnerabilities to update the data hive with information which may be used in new attacks. For instance, if credentials are discovered in an employee's email, the system will identify an opportunity to use these credentials with another service. The steps in the process for a vulnerability testing process are detailed in FIG. 4.

When the system encounters a customized or custom developed web application in the target system, the system operates in a manner as noted above.

When the system identifies a web application, the tables within the data hive for the web application will not contain any information. This will force the classifier to perform reconnaissance (i.e., a data gathering or a data sweep operation) as a first step. This may include launching web-spider modules, or URL brute force modules in an attempt to map out the size of the application. During this process, the system will save any information encountered that pertains to each web page that is discovered. This may include, among other data, HTTP response codes, response sizes and HTTP methods. The results of the initial reconnaissance are stored in the data hive and will affect the hive state. Based on the new hive state, the prediction stage will cause modules to analyze each web page discovered. During this process, the system will use a variety of modules based on how each page is classified. Pages might receive multiple classifications and this may cause a single page to be processed in multiple ways. As an example, one neural network might flag a web page to be using PHP and, consequently, will cause the selection of a PHP attack module. Another neural network might notice that the same web page has a login portal and this neural network might determine that a login attack should be performed. A third neural network might determine that, rather than performing a password guessing attack, the login form should be tested for injection vulnerabilities. This shows that the system may check, in parallel, many possibilities for the existence of vulnerabilities. Moreover, this parallel scanning is accomplished while narrowing the scope of the scanning down to a select few modules that are relevant to the web application.

It should be noted that the analysis of each page in the web application may also include additional intelligence. One example is the use of natural language processing to identify sensitive information and to further identify additional attack vectors. As another example, image recognition may be used to break CAPTCHA tests and to circumvent other security mechanisms.

Each vulnerability discovered in the web application passes through an analysis process that leads to multiple attack and exploitation attempts as the classifier neural networks identify additional opportunities. When a vulnerability in the web application is successfully exploited, post-exploitation opportunities will be identified. This may lead to the system's extraction of sensitive information from the web application databases or to the system gaining remote code execution. As with other data discovered in other attacks and exploits, any findings from any post-exploitation module are saved in the data hive. Such new data may lead to new opportunities for attacks that can be identified by the classifier neural networks. As a further example, if a SQL injection attack is performed and the system is able to extract administrator credentials from a database, the system can then identify the opportunity to use those credentials in a login form that may have been previously discovered. This process is repeated many times until all possible attack paths have been exhausted.

As with other attack vectors, for web applications, if successful exploitation of the various vulnerabilities occur and code execution is achieved on the targeted system, the system can activate different hemispheres to identify opportunities for deploying payloads such as Trojans. When this occurs, the system will follow the same intelligent workflow as the post-exploitation portion of the penetration testing hemisphere.

It should be clear that, to assist in determining the vulnerabilities of web applications, the system may implement artificial intelligence techniques and subsystems. In one implementation, the web application is analyzed to determine its environment and, possibly, its templates. The environment and/or the templates for the web application are then classified using known artificial intelligence methods and, based on what the web application's environment and/or templates, known weaknesses and/or vulnerabilities of those environment/templates can then be exploited by the system.

Figure 5:
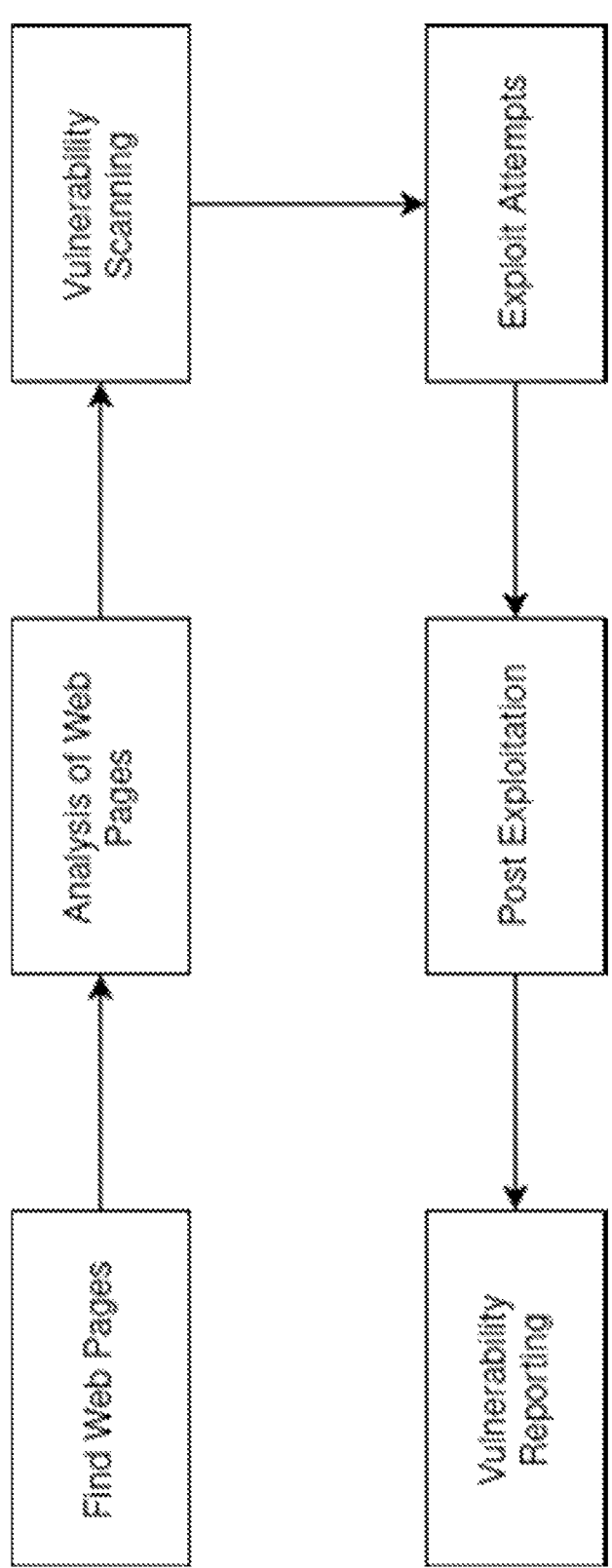
FIG. 5 is a flow diagram showing the steps in web application vulnerability testing.

The steps in the testing of web applications are detailed in FIG. 5.

It must be noted that, to initially train the various neural networks that are producing the predictions, multiple artificially generated hive states that resemble a specific data hive state are passed into the neural network to be trained to create a raw prediction. Then, using the calculated error from an initial prediction, adjustments to neuron dendrites can be made through a well-known process called back-propagation. This process can be completed a number of times until the calculated error on each cycle is acceptable. This is the standard way of training a feed-forward artificial neural network.

It should also be noted, as discussed above, that the system continues to learn after initial training. If an attack or exploit is successful (i.e., that attack or exploit changes the hive state), the initial hive state and data from the relevant attack or exploit module are stored in the hive storage and provide a basis for future predictions. This storage practice, coupled with the ability of the system to select a random module in certain circumstances (as already described), allows the system to account for new information and attempt attacks and/or exploits that it would not have initially predicted. Additionally, storing attack data in this way allows other neural networks on other, geographically separated systems to learn from the experiences of their peers. Thus, multiple bots can simultaneously benefit from one bot's use of trial-and-error-based learning, in a community-learning process.

In one implementation, the various parts of the system communicate with each other by way of an IRC network. The IRC communications can also act as event logs that allow operators to monitor operations. Servers that are geographically dispersed can communicate through the IRC network.

As noted above, the system generates possible attacks given a current state of the target computer system. The system may use the included trained machine learning models 60A, 60B, 60C to determine what the possible outcomes of one or more attacks may be. As noted above, the current state of the target system may be used as input to a hemisphere and, based on that current state, the hemisphere may recommend/generate a possible attack. The hemisphere, using the machine learning models, may then generate a possible outcome/end state given the target system's initial state and a potential attack. Of course, this generation of a possible end state may be generated based on previous attacks, previous initial states, and the resulting end state of the target system after the attack has been implemented. To this end, entries for a training data set may be generated for each attack implemented against a target computer system. Generating an entry may include determining the target system's initial state, determining a specific attack's parameters (e.g. what the inputs are used for any software used against/within the target system), and determining the target system's end state after the specific attack has been implemented. This set of data may form a data set and may be used as an entry for the training data set to train one or more of the machine learning models. The data set may be enhanced by determining the difference between the target system's initial state and the target system's end state. Of course, if there is little difference between the initial state and the end state, the attack may not have been very useful. However, if there is a large difference between the initial and end states, then the attack would have been impactful. This data set that includes the initial state, the attack parameters, and the end state is not only used in a training data set but is also saved within the hive and can operate as input to be considered when assessing a next attack to implement.

As a variant of the above, the system may also gather or assess the impact/effect of a series/group of attacks. To clarify, if, from time $t_1$ to time $t_n$, attacks $a_1, a_2, a_3, \ldots a_n$ have been implemented against target computer system x, the system may assess the cumulative impact of these attacks on the target computer. Thus, since each attack generates a data set for that attack (as noted above, this includes the initial state, the attack parameters, and the end state), the system can then assess, for each attack, a difference between the initial state and the end state. The system, by extension, can then determine the cumulative difference across all these attacks. Thus, the difference for attack $a_1$, the difference for attack $a_2$, the difference for attack $a_3$, etc., can all be accumulated/summed up for a cumulative difference. The system can thus determine if a series/sequence of attacks have been impactful as compared to another series/sequence of attacks. Based on this capability, the system can assess whether a sequence/series of attacks have, over time, had greater/lesser impact on the target system. This can, of course, be compared to other sequences of attacks, other periods of time, even other sequences of attacks against other target systems. This can also be used to determine if a current sequence/series of attacks have an increasing or decreasing impact on the state of the target system. Such an assessment can then be used by the system to determine if the current sequence of attacks is to be continued or if a difference direction may be more impactful.

It should be clear that the differences between initial and end states after an attack can be seen as not just the impact of an attack but as a "reward" for the system with larger differences being considered as a "better" reward or simple as more impactful. Depending on the desired result, the system may opt to maximize the impact of different attacks or of sequences of attacks. Similarly, depending on the desired result, the configuration of the system may be set to minimize such impact of attacks or sequences of attacks.

It should further be clear that the cumulative differences (i.e. impact over time on the target system)) of sequences of attacks may along with the sequences of attacks and the data sets for each of these attacks, be used as part of a training data set for these machine learning models. Such training data sets, as well as training data sets from the differences between initial and end states for specific attacks, may be used to train the machine learning models to thereby predict the end state of individual attacks as well as to predict the cumulative impact of a series or sequence of attacks.

For better clarity, to determine the cumulative impact or difference from a sequence of attacks, the system first determines the sequence or series of attacks to be assessed. Then, for each of these attacks, the difference (or impact) of the attack is determined from the initial (pre-attack) state and the end (post attack) states. These differences for each attack are then accumulated/summed to arrive at the cumulative difference for the sequence of attacks. As noted above, this cumulative difference may also be seen as the overall impact of this sequence of attacks on the target system.

Such a capability allows the system to determine, from a range of attack options, which option produces the best results. As an example, if multiple hemispheres are active and each hemisphere recommends/proposes a different attack, the system can therefore assess which potential attack would produce the greatest difference/produce the greatest impact. Of course, this would involve predicting the possible outcome of each potential attack but, as noted above, this can be implemented by having trained machine learning models that have been trained on training data sets composed of multiple data sets from previous attacks as well as previous sequences of attacks. Such predictions should be able to predict not just the outcome of individual attacks but may also be able to predict the outcome of potential sequences of attacks. Given the current state of a target system, the system, using suitably trained machine learning models, should be able to reasonably predict the outcome of individual potential attacks as well as the possible outcome of a series or sequence of potential attacks. Of course, with this capability, the system can then select attacks based on which available attack maximizes the difference between the initial state and the potential end state (i.e., which available attack has the greatest impact). These machine learning models may perform the predictions noted above regarding potential attacks that are being assessed.

For clarity, the above discussion detailing the scoring or the states of the target system as binary values or hive scores provides for finding a target system's initial state (the pre-attack score) before an attack and the target system's end state (the after attack score). The impact or difference between these two states or scores may be seen as the reward for the system for an attack. And, as noted above, the system allows for randomized attacks or randomized actions, the system can, essentially, explore new avenues/new directions of attack.

It should be clear that the above capability for the assessment of the impact of individual attacks or of the impact of a sequence of attacks is present for each hemisphere and for the system as a whole. Thus, a hemisphere can, when presented with multiple potential attacks of the same type (but with differing parameters), assess each attack for potential impact and can recommend the potential attack with the greatest potential impact. Similarly, the system, when presented with different types of attacks from different active hemispheres (e.g. one potential attack is a social media mining-based attack, another potential attack is the insertion and operation of a worm in the target system, and a third potential attack is to probe for any open ports on the target system), the system can assess each potential attack for greatest impact. Or, depending on the desired end result, the system can opt for the least impact or least visible impact or least detectable impact. As an example, if the penetration testing is to test if the target system can detect possible penetration probes, then the system may opt for attacks that are the least detectable or for attacks whose effects are least detectable by the target system. It should also be clear that the system can optimize (i.e., maximize or minimize) based on any characteristic, be it impact on the target system, detectability (or non-detectability) by the target system, resources used on the target system (as large resource use may trigger detectability on the target system), alarms/warnings generated on the target system, or any other characteristic that may be useful.

In terms of what other types/kinds of attacks may be used by the system of the present invention, provided below is a non-exhaustive list of potential attacks:

login-based attacks to gain unauthorized access to said target computer system;

attacks based on sending illegitimate emails masquerading as legitimate emails to users of said target computer system;

attacks based on an analysis of at least one web application being executed by said target computer system;

attacks based on data regarding potential users of said target computer system, said data being gathered from an analysis of results from at least one automated online search;

external attacks on said at least one target computer system, said external attacks originating from an attacker logically remote from said at least one target computer system's internal network;

internal attacks on said at least one target computer system, said internal attacks originating from an attacker logically located within said at least one target computer system's internal network;

an attack based on an exploitation of a web-based application;

an attack based on an exploitation of a mobile-based application;

an attack based on credentials fraudulently obtained from one or more users of said at least one target computer system;

an attack based on vulnerabilities in telephony systems;

an attack based on vulnerabilities in radio-based communications systems;

an attack based on vulnerabilities of wi-fi networks;

an attack based on escalating user privileges on said at least one target computer system;

an attack based on execution of one or more instances of malicious software on said at least one target computer system;

an attack based on establishing command and control of said at least one target computer system while communications between an attacker and said at least one target computer system are under scrutiny;

an attack based on exploiting a business model of an operator of said at least one target computer system;

an attack based on compromising at least one characteristic of a block-chain, said at least one characteristic being at least one of: confidentiality, integrity, or availability;

an attack based on causing unexpected AI behaviour;

an attack based on an exploitation of an operational technology network such that said operation technology network's characteristic is compromised, said characteristic being at least one of confidentiality, integrity, and availability.

Regarding the training of the various machine learning models, the data generated for each executed attack/action is logged and tagged into the data hive. Since each hemisphere is, in one implementation, tasked with a specific type/kind of attack, the training data set used for a hemisphere's one or more machine learning models may be unique to that hemisphere. As an example, a training data set generated from social media based attacks (executed by hemisphere A) may not be as useful for machine learning models used by hemisphere B (tasked with port sniffing based attacks). Accordingly, the training data sets generated from attacks/actions implemented by hemisphere A would be used to further train/refine the machine learning models used by hemisphere A. Similarly, the training data sets generated from hemisphere B's attacks/actions would be used to train/adjust the actions/predictions of the machine learning models used by hemisphere B. That being said, the machine learning models used by the system to determine which attacks/actions to implement may be internal to the various hemispheres or they may be external to the hemispheres. As an example, the system, when confronted with attack options A, B, and C, can use the machine learning models used in the various hemispheres proposing attack options A, B, and C to determine the potential impact/potential effect of each of these attack options. Once the system has gathered these predicted impact/predicted effect of each potential attack, the system can then select a suitable attack based on the system's configuration (e.g. the system can optimize on maximum effect or on minimal detectability or on maximal effect on a specific target system parameter, etc.).

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for organizing computer resources for testing a security of a target network, the target network being a computer network, the method comprising:
(a) receiving data and characteristics for said target network and storing said data and characteristics in a central data storage data hive;
(b) determining a state of said target network based on said data and characteristics stored in said data hive;
(c) formulating a plurality of potential attacks, said potential attacks being against said target network based on said state;
(d) for each one of said plurality of potential attacks, determining if a module exists for said one of said plurality of potential attacks based on said state, said one of said plurality of potential attacks being a module-validated potential attack if said module exists for said one of said plurality of potential attacks, and said one of said plurality of potential attacks being invalid if no said module exists for said one of said plurality of potential attacks;
(e) when at least one of said plurality of potential attacks is a module-validated potential attack, determining if conditions for said module-validated potential attack are present based on said data and characteristics in said data hive, said module-validated potential attack being an executable attack if said conditions are present and said module-validated potential attack being invalid if said conditions are absent;
(f) provisioning resources for each executable attack;
(g) executing said each executable attack, wherein data that is generated by said each executable attack is saved in said data hive, wherein said data comprises:
an initial state of said target network prior to said execution of said executable attack; and
an end state of said target network after said executable attack has been executed; and
(h) determining a difference between said initial state and said end state,
and wherein said method further comprises:
(aa) determining a sequential series of previous attacks;
(ab) determining a difference between said initial state and said end state for each of said series of previous attacks; and
(ac) determining a cumulative difference for said series of previous attacks, said cumulative difference being a sum of differences determined for each of said series of previous attacks.

2. The method according to claim 1, wherein said data generated in step (g) further comprises parameters of said executable attacks.

3. The method according to claim 1, wherein said difference is stored in said storage.

4. The method according to claim 3, wherein said data generated in step (g) and said difference are used in at least one training data set for training a machine learning model for predicting potential outcomes of one or more executable attacks.

5. The method according to claim 1, wherein a trained machine learning model is used to predict outcomes of potential executable attacks prior to execution of said potential executable attacks and said method includes calculating differences between said initial state and said end state of said potential executable attacks.

6. The method according to claim 5, wherein steps (aa)-(ac) are repeated for each of at least two sequential series of previous attacks and wherein results for steps (aa)-(ac) for each of said at least two sequential series of previous attacks are combined with said differences for said potential executable attacks to determine which of said potential executable attacks are to be executed.

7. The method according to claim 1, wherein said cumulative differences for multiple sequential series of previous attacks are used in a training data set to train a machine learning model for predicting outcomes of potential executable attacks.

8. The method according to claim 7, wherein said machine learning model is for at least one of:
predicting outcomes of a series of potential executable attacks;
predicting outcomes of potential executable attacks given an initial state and a potential executable attack; and determining which hemisphere to use for a next executable attack.

9. A system for use in security testing at least one target computer system, the system comprising:
   a command and control server for controlling and managing said system;
   a central data storage for said system;
   a plurality of processors, at least one of said plurality of processors executing computer readable instructions that implements a plurality of neural networks, said plurality of neural networks being organizable into hemisphere groups, each hemisphere group being tasked with at least one specific task, each of said plurality of processors being enabled to send and receive data to and from said central data storage and each of said plurality of processors being enabled for data communication with at least one other processor and with said command and control server;
   at least one trained machine learning model;
wherein
   any data collected by processes executed by said plurality of processors regarding said at least one target computer system is stored in said central data storage; and
   said system uses said at least one trained machine learning model to determine which potential attacks to execute against said at least one target computer system;
   said potential attacks being formulated based on said data stored in said central data storage,
and wherein said at least one trained machine learning model has a function that is at least one of:
   predicting outcomes of a series of potential attacks;
   predicting outcomes of potential attacks given an initial state and a potential executable attack; and
   determining which hemisphere to use for a next executable attack.

10. The system according to claim 9, wherein said potential attacks includes at least one of:
   login-based attacks to gain unauthorized access to said target computer system;
   attacks based on sending illegitimate emails masquerading as legitimate emails to users of said target computer system;
   attacks based on an analysis of at least one web application being executed by said target computer system;
   attacks based on data regarding potential users of said target computer system, said data being gathered from an analysis of results from at least one automated online search;
   external attacks on said at least one target computer system, said external attacks originating from an attacker logically remote from said at least one target computer system's internal network;
   internal attacks on said at least one target computer system, said internal attacks originating from an attacker logically located within said at least one target computer system's internal network;
   an attack based on an exploitation of a web-based application;
   an attack based on an exploitation of a mobile-based application;
   an attack based on credentials fraudulently obtained from one or more users of said at least one target computer system;
   an attack based on vulnerabilities in telephony systems;
   an attack based on vulnerabilities in radio-based communications systems;
   an attack based on vulnerabilities of wi-fi networks;

an attack based on escalating user privileges on said at least one target computer system;
   an attack based on execution of one or more instances of malicious software on said at least one target computer system;
   an attack based on establishing command and control of said at least one target computer system while communications between an attacker and said at least one target computer system are under scrutiny;
   an attack based on exploiting a business model of an operator of said at least one target computer system;
   an attack based on compromising at least one characteristic of a block-chain, said at least one characteristic being at least one of: confidentiality, integrity, or availability;
   an attack based on causing unexpected AI behaviour;
   an attack based on an exploitation of an operational technology network such that said operation technology network's characteristic is compromised, said characteristic being at least one of confidentiality, integrity, and availability.

11. The system according to claim 9, wherein said system predicts a result of said potential attacks based on data gathered from previous attacks.

12. The system according to claim 9, wherein each attack, after execution, generates data including:
   an initial state of said target computer system prior to said execution of said attack;
   parameters of said attack; and
   an end state of said target network after said attack has been executed.

13. The system according to claim 12, wherein said data includes a difference between said initial state and said end state for said attack.

14. The system according to claim 13, wherein said difference and said data determined for said attack is stored in said storage.

15. The system according to claim 14, wherein said data determined for said attack and said difference are used in at least one training data set for training said at least one machine learning model.

16. The system according to claim 13, wherein said system executes a method that includes:
   aa) determining a sequential series of previous attacks;
   ab) determining a difference between said initial state and said end state for each of said series of previous attacks; and
   ac) determining a cumulative difference for said series of previous attacks, said cumulative difference being a sum of differences determined for each of said series of previous attacks.

17. The system according to claim 16, wherein said at least one trained machine learning model is used to predict outcomes of potential attacks prior to execution of said potential attacks and said system calculates differences between said initial state and said end state of said potential attacks.

18. The system according to claim 16, wherein said system repeats steps aa)-ac) for each of at least two sequential series of previous attacks and wherein results for steps aa)-ac) for each of said at least two sequential series of previous attacks are combined with said differences for said potential attacks to determine which of said potential attacks are to be executed.

19. The system according to claim 16, wherein said cumulative differences for multiple sequential series of previous attacks are used in a training data set to train said at least one machine learning model.

* * * * *